United States Patent  (10) Patent No.: US 8,935,043 B2
Li et al.  (45) Date of Patent: Jan. 13, 2015

(54) TEMPERATURE COMPENSATED BATTERY PARAMETER ESTIMATION

(71) Applicant: Ford Global Technologies, LLC, Dearborn, MI (US)

(72) Inventors: Yonghua Li, Ann Arbor, MI (US); Xu Wang, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 43 days.

(21) Appl. No.: 13/752,487

(22) Filed: Jan. 29, 2013

(65) Prior Publication Data

US 2014/0214268 A1 Jul. 31, 2014

(51) Int. Cl.
*G06F 7/00* (2006.01)
*B60L 3/12* (2006.01)

(52) U.S. Cl.
CPC ...................................... *B60L 3/12* (2013.01)
USPC ............................. 701/34.4; 702/63; 320/132

(58) Field of Classification Search
CPC .......... B60L 11/1861; B60L 2240/545; B60L 2240/549; B60L 2260/44; G01R 31/3624
USPC .................................. 701/34; 702/63; 320/132
See application file for complete search history.

(56) References Cited

U.S. PATENT DOCUMENTS

| 6,534,954 | B1 | 3/2003 | Plett | |
|---|---|---|---|---|
| 7,593,821 | B2 | 9/2009 | Plett | |
| 7,994,755 | B2 | 8/2011 | Plett | |
| 8,103,485 | B2* | 1/2012 | Plett | 703/2 |
| 8,449,998 | B2* | 5/2013 | Koetting | 429/50 |
| 2007/0299620 | A1* | 12/2007 | Yun et al. | 702/63 |

OTHER PUBLICATIONS

Gregory L. Plett, Extended Kalman filtering for battery management systems of LiPB-based HEV battery packs, Journal of Power Sources 134, (2004) 252-261.
Greg Welch and Gary Bishop, An Introduction to the Kalman Filter, UNC-Chapel Hill, TR 95-041, Jul. 24, 2006.

* cited by examiner

*Primary Examiner* — McDieunel Marc
(74) *Attorney, Agent, or Firm* — David B. Kelley; Brooks Kushman, P.C.

(57) ABSTRACT

A vehicle is provided with a vehicle system having an electric machine and a battery. The electric machine is configured to provide drive torque and the battery supplies power to the electric machine. The vehicle also includes a controller that is configured to generate output indicative of at least one of a battery power capability and a battery state of charge using a filter having a variable EKF gain factor based on battery temperature.

18 Claims, 6 Drawing Sheets

TEMPERATURE COMPENSATED BATTERY PARAMETER ESTIMATION

TECHNICAL FIELD

One or more embodiments relate to a vehicle system for estimating battery parameters using temperature compensation.

BACKGROUND

In vehicles having a traction battery system, such as a hybrid electric vehicle (HEV), plug-in HEV (PHEV) or battery electric vehicle (BEV), vehicle controls evaluate a level of charge in the battery (state of charge (SOC)), and how much power the battery can provide (discharge) or receive (charge) in order to meet the driver demand and to optimize the energy usage (power limit). A battery may be represented by an equivalent circuit model (ECM) having battery ECM parameters (circuit elements) that represent battery characteristics. Battery parameters (such as SOC and power capability) calculations may be based on the battery ECM parameters.

A battery management system may calculate the SOC as a percentage of available charge as compared with a maximum charge capacity. One such method for calculating SOC is the ampere-hour integration method. A battery management system may, for example, calculate the battery power limit based on battery age, temperature, and SOC. The SOC and the battery power limits can then be provided to various other vehicle controls, for example, through a vehicle system controller (VSC) so that the information can be used by systems that may draw power from or provide power to the traction battery.

SUMMARY

In one embodiment, a vehicle is provided with an electric machine and a battery. The electric machine is configured to provide drive torque and the battery supplies power to the electric machine. The vehicle also includes a controller that is configured to generate output indicative of at least one of a battery power capability and a battery state of charge using a filter having a variable gain based on battery temperature.

In another embodiment, a vehicle system is provided with a battery for supplying power to an electric machine and a controller. The controller is configured to receive input indicative of a battery temperature, and to select a gain factor from predetermined data based on the battery temperature. The controller is further configured to estimate a variable gain based on the gain factor, and to generate output indicative of at least one of a battery power capability and a battery state of charge based in part on the variable gain.

In yet another embodiment, a method for controlling a hybrid vehicle is provided. Input signals are received that are indicative of a battery temperature, a battery current and a battery voltage. Output is generated that is indicative of at least one of a battery power capability and a battery SOC, using an extended Kalman filter (EKF) having a variable gain that is based on the input signals.

The vehicle system provides advantages over existing methods by estimating battery parameters using an EKF having a variable EKF gain factor that depends on battery temperature. Such a temperature compensated gain scheduling approach results in a more accurate estimation of the SOC and battery power capability as compared to existing methods that use a fixed EKF gain factor.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
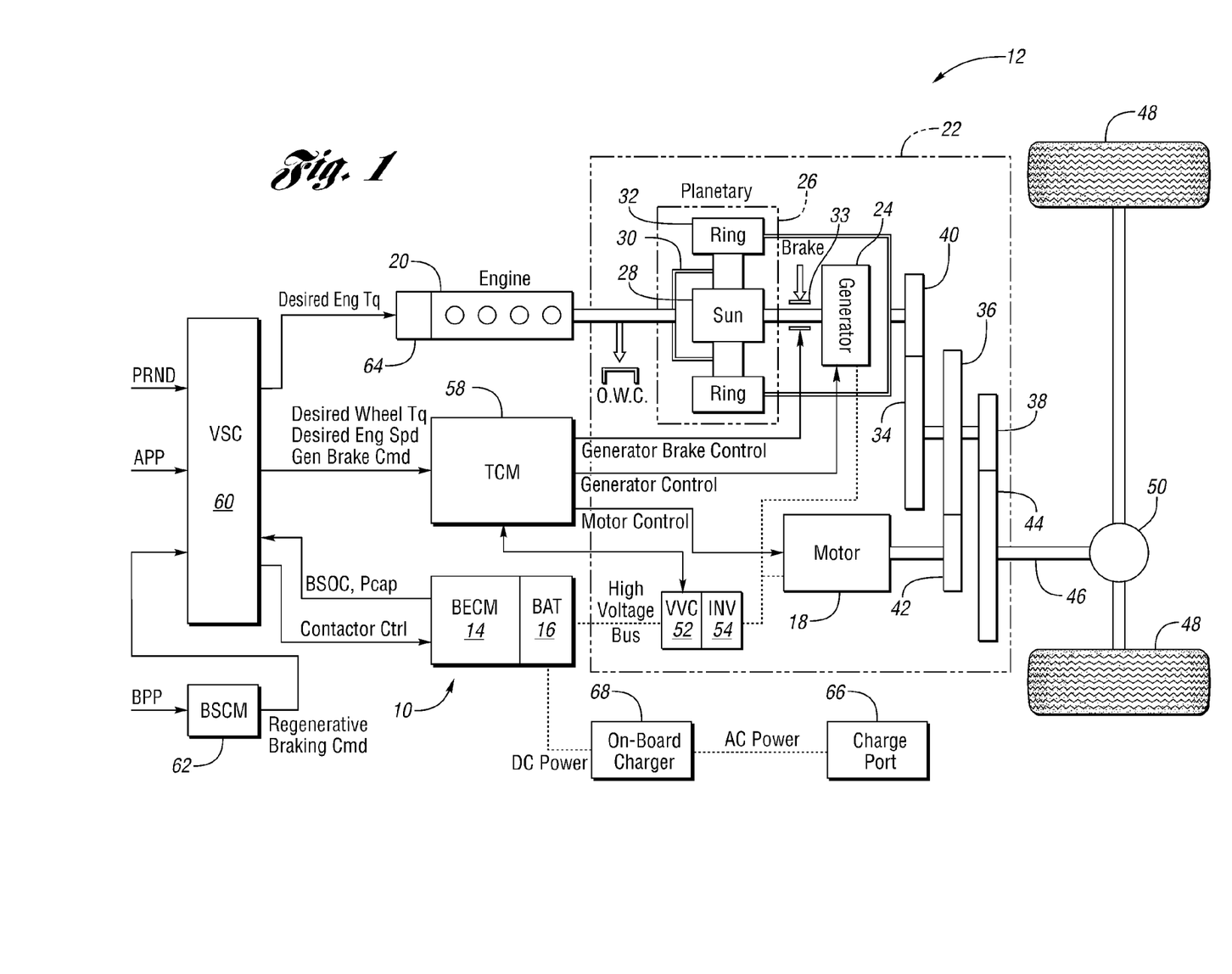
FIG. 1 is a schematic diagram of a vehicle, illustrated with a vehicle system for estimating battery parameters according to one or more embodiments.

With reference to FIG. 1, a vehicle system for estimating battery parameters is illustrated in accordance with one or more embodiments and is generally referenced by numeral 10. The vehicle system 10 is depicted within a vehicle 12. The vehicle system 10 includes a controller, such as a battery control module (BECM) 14 and a battery 16 that are in communication with each other. The BECM 14 receives input including battery temperature, voltage and current and provides output that is indicative of battery ECM parameters. The BECM 14 also calculates battery power capability ($P_{cap}$) and battery SOC based on the battery ECM parameters.

The illustrated embodiment depicts the vehicle 12 as an HEV, which is an electric vehicle propelled by an electric machine 18 with assistance from an internal combustion engine 20. The electric machine 18 is an AC electric motor according to one or more embodiments, and is depicted as a "motor" 18 in FIG. 1. The electric machine 18 receives electrical power and provides drive torque for vehicle propulsion. The electric machine 18 also functions as a generator for converting mechanical power into electrical power through regenerative braking.

The vehicle 12 includes a transmission 22 having a power-split configuration, according to one or more embodiments. The transmission 22 includes the first electric machine 18 and a second electric machine 24. The second electric machine 24 is an AC electric motor according to one or more embodiments, and is depicted as a "generator" 24 in FIG. 1. Like the first electric machine 18, the second electric machine 24 receives electrical power and provides output torque. The second electric machine 24 also functions as a generator for converting mechanical power into electrical power and optimizing power flow through the transmission 22.

The transmission 22 includes a planetary gear unit 26, which includes a sun gear 28, a planet carrier 30 and a ring gear 32. The sun gear 28 is connected to an output shaft of the second electric machine 24 for receiving generator torque. The planet carrier 30 is connected to an output shaft of the engine 20 for receiving engine torque. The planetary gear unit 26 combines the generator torque and the engine torque and provides a combined output torque about the ring gear 32. The planetary gear unit 26 functions as a continuously variable transmission, without any fixed or "step" ratios.

The transmission 22 also includes a one-way clutch (O.W.C.) and a generator brake 33, according to one or more embodiments. The O.W.C. is coupled to the output shaft of the engine 20 to only allow the output shaft to rotate in one direction. The O.W.C. prevents the transmission 22 from back-driving the engine 20. The generator brake 33 is coupled to the output shaft of the second electric machine 24. The generator brake 33 may be activated to "brake" or prevent rotation of the output shaft of the second electric machine 24 and of the sun gear 28. In other embodiments, the O.W.C. and the generator brake 33 are eliminated, and replaced by control strategies for the engine 20 and the second electric machine 24.

The transmission 22 includes a countershaft having a first gear 34, a second gear 36 and a third gear 38. A planetary output gear 40 is connected to the ring gear 32. The planetary output gear 40 meshes with the first gear 34 for transferring torque between the planetary gear unit 26 and the countershaft. An output gear 42 is connected to an output shaft of the first electric machine 18. The output gear 42 meshes with the second gear 36 for transferring torque between the first electric machine 18 and the countershaft. A transmission output gear 44 is connected to a transmission output shaft 46. The transmission output shaft 46 is coupled to a pair of driven wheels 48 through a differential 50. The transmission output gear 44 meshes with the third gear 38 for transferring torque between the transmission 22 and the driven wheels 48.

Although illustrated and described in the context of a HEV 12, it is understood that embodiments of the present application may be implemented on other types of electric vehicles, such as BEVs which are powered by an electric motor without assistance of an internal combustion engine.

The vehicle 12 includes the battery 16 for storing electrical energy. The battery 16 is a high voltage battery that is capable of outputting electrical power to operate the first electric machine 18 and the second electric machine 24. The battery 16 also receives electrical power from the first electric machine 18 and the second electric machine 24 when they are operating as generators. The battery 16 is a battery pack made up of several battery modules (not shown), where each battery module contains a plurality of battery cells (not shown). Other embodiments of the vehicle 12 contemplate different types of energy storage systems, such as capacitors and fuel cells (not shown) that supplement or replace the battery 16. A high voltage bus electrically connects the battery 16 to the first electric machine 18 and to the second electric machine 24.

The BECM 14 controls the battery 16. The BECM 14 receives input that is indicative of vehicle conditions and battery conditions, such as battery temperature, voltage and current. The BECM 14 estimates battery ECM parameters that correspond to battery characteristics. The BECM 14 also estimates battery SOC and the battery power capability ($P_{cap}$) based on the battery ECM parameters. The BECM 14 provides output (SOC, $P_{cap}$) that is indicative of the SOC and the battery power capability to other vehicle systems and controllers. In another embodiment, the BECM 14 receives the battery SOC as an input, which is provided by other means.

The vehicle 12 includes a variable voltage converter (VVC) 52 and an inverter 54 that are electrically connected along the high voltage bus. The VVC 52 boosts or steps up the voltage potential of the electrical energy that is provided by the battery 16. The VVC 52 may also "buck" or step down the voltage potential of the electrical energy that is provided to the battery 16, according to one or more embodiments. The inverter 54 inverts the direct current (DC) energy supplied by the battery 16 (through the VVC 52) to alternating current (AC) energy for operating the electric machines 18, 24. The inverter 54 also rectifies AC power provided by the electric machines 18, 24, to DC for charging the main battery 16.

The transmission 22 includes a transmission control module (TCM) 58 for controlling the electric machines 18, 24, the VVC 52 and the inverter 54. The TCM 58 is configured to monitor, among other things, the position, speed, and power consumption of the electric machines 18, 24. The TCM 58 also monitors electrical parameters (e.g., voltage and current) at various locations within the VVC 52 and the inverter 54, according to one or more embodiments. The TCM 58 provides output signals corresponding to this information to other vehicle systems.

The vehicle 12 includes a vehicle system controller (VSC) 60 that communicates with other vehicle systems and controllers for coordinating their function. Although it is shown as a single controller, the VSC 60 may include multiple controllers that may be used to control multiple vehicle systems according to an overall vehicle control logic, or software.

The vehicle controllers, including the VSC 60 and the BECM 14 generally include any number of microprocessors, ASICs, ICs, memory (e.g., FLASH, ROM, RAM, EPROM and/or EEPROM) and software code to co-act with one another to perform a series of operations. The controllers also include predetermined data, or "look up tables" that are based on calculations and test data and stored within the memory. The VSC 60 communicates with other vehicle systems and controllers (e.g., the BECM 14 and the TCM 58) over one or more hardwired or wireless vehicle connections using common bus protocols (e.g., CAN and LIN). The VSC 60 receives input (PRND) that represents a current position of the transmission 22 (e.g., park, reverse, neutral or drive). The VSC 60 also receives input (APP) that represents an accelerator pedal position. The VSC 60 provides output that represents a desired wheel torque, desired engine speed, and generator brake command to the TCM 58; and contactor control to the BECM 14.

The vehicle 12 includes a braking system (not shown) which includes a brake pedal, a booster, a master cylinder, as well as mechanical connections to the driven wheels 48, to effect friction braking. The braking system also includes position sensors, pressure sensors, or some combination thereof for providing information such as brake pedal position (BPP) that corresponds to a driver request for brake torque. The braking system also includes a brake system control module (BSCM) 62 that communicates with the VSC 60 to coordinate regenerative braking and friction braking. The BSCM 62 provides a regenerative braking command to the VSC 60, according to one embodiment.

The vehicle 12 includes an engine control module 64 for controlling the engine 20. The VSC 60 provides output (desired engine torque) to the engine control module 64 that is based on a number of input signals including APP, and corresponds to a driver's request for vehicle propulsion.

The vehicle 12 is configured to receive power from an external source, according to one or more embodiments. The battery 16 periodically receives AC energy from an external power supply or grid, via a charge port 66. The charge port 66 may be configured to receive an external electrical plug or connector ("plug-in"), or may be configured for inductive charging. The vehicle 12 also includes an on-board charger 68, which receives the AC energy from the charge port 66. The charger 68 is an AC/DC converter which converts the received AC energy into DC energy suitable for charging the battery 16. In turn, the charger 68 supplies the DC energy to the battery 16 during recharging.

Figure 2:
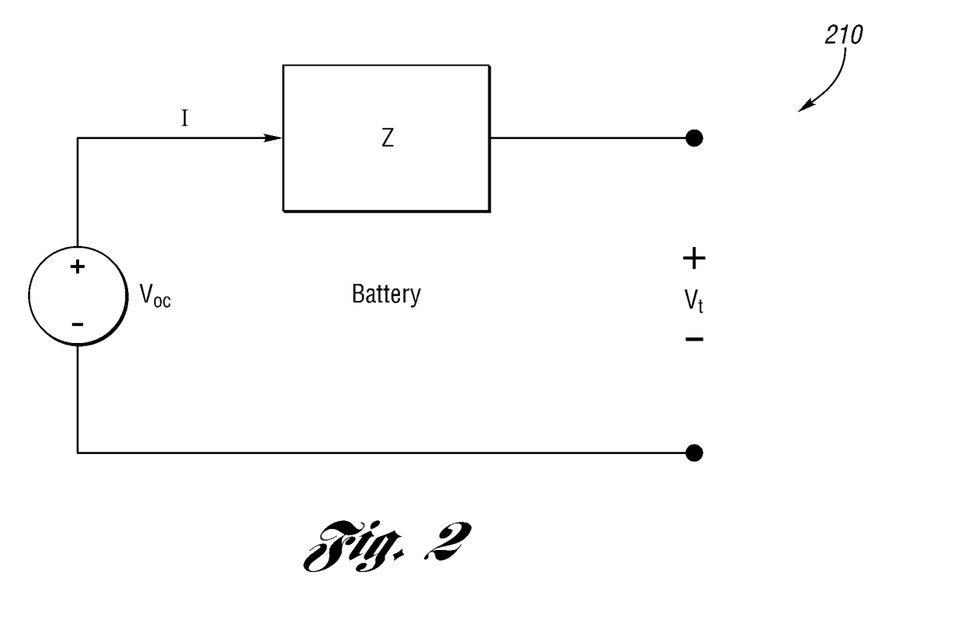
FIG. 2 is a general circuit model that can be used by the vehicle system of FIG. 1 to model the behavior of a battery.

Referring to FIGS. 1 and 2, the BECM 14 is configured to receive input that is indicative of vehicle conditions and battery conditions, such as battery temperature, voltage and current. The BECM 14 estimates the battery ECM parameters based on the input. The BECM 14 also calculates the battery SOC and the battery power capability ($P_{cap}$) based on the battery ECM parameters and the input. The BECM 14 provides the $P_{cap}$ and SOC to other vehicle systems and controllers that provide power to or receive power from the battery 16. For example, the TCM 58 may limit the amount of electrical power supplied to the electric machines 18, 24 when the SOC is below a low SOC threshold. The TCM 58 may also reduce the amount of electrical power supplied to the battery 16 from the electric machines 18, 24, when the SOC is above a high SOC threshold. In one or more embodiments, the BECM 14 receives the SOC as an input, and estimates $P_{cap}$ based in part on the SOC.

FIG. 2 depicts a generalized equivalent circuit model 210 which represents the battery 16 and its internal impedance (Z). The battery load can be electrical components (e.g., the electric machines 18, 24) that are drawing current from the battery 16. Specified in the circuit model 210 are an open circuit voltage ($V_{oc}$), a battery current (I), a terminal voltage ($V_t$), and a generalized impedance sub-circuit (Z). It is understood that the sub-circuit (Z) may contain a number of different electrical elements, such as resistors, capacitors, inductors and the like. As discussed in detail below, the purpose of the circuit 210 is to provide information regarding a battery that can be used to determine SOC and $P_{cap}$. Therefore, the circuit model 210 may more accurately represent the behavior of the battery if the sub-circuit (Z) contains a relatively large number of electrical components. However, with an increased number of components in the sub-circuit (Z) there is also an attendant increase in the complexity of the equations that govern the circuit model. As described above with respect to FIG. 1, the battery 16 is a battery pack made up of several battery modules (not shown), where each battery module contains a plurality of battery cells (not shown). The ECM 210 represents a battery pack, and the vehicle system 10 estimates battery parameters corresponding to the overall battery pack. However, other embodiments of the vehicle system 10 contemplate a battery cell equivalent circuit model for estimating battery cell parameters.

Figure 3:
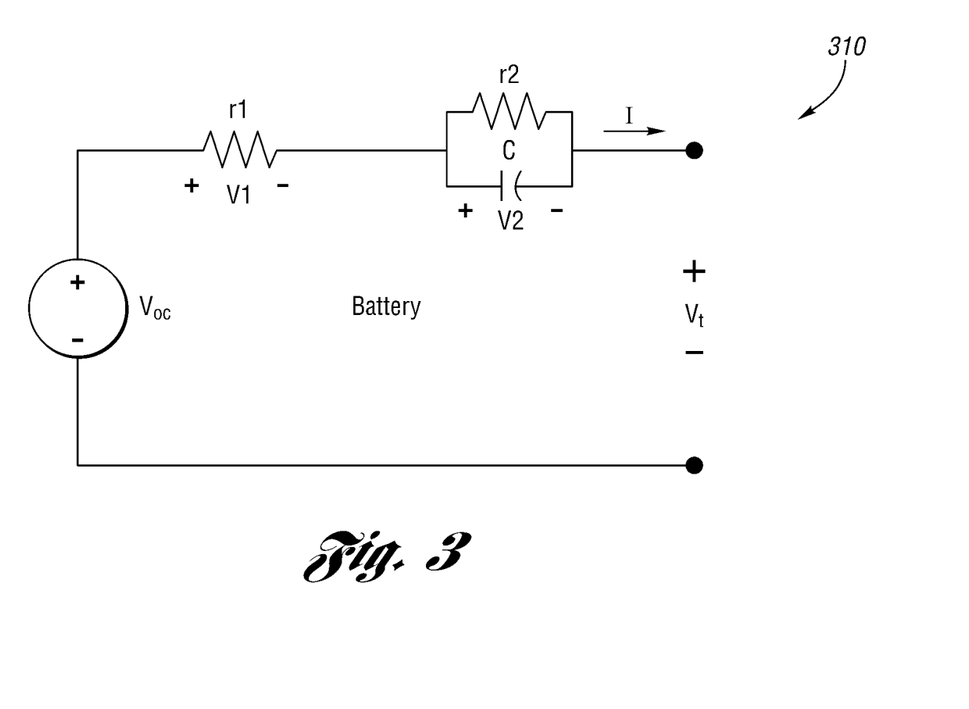
FIG. 3 is a detailed circuit model based on the general circuit model of FIG. 2.

FIG. 3 illustrates a simplified Randle's equivalent circuit model 310 that is based on the general circuit model 210 of FIG. 2. The sub-circuit (Z) is made up of three discrete electrical components, specifically, two resistors ($r_1$, $r_2$) and one capacitor (c). A pair of governing equations for the circuit model 310 can be written as follows:

$$\dot{V}_2 = -\frac{1}{r_2 c} V_2 + \frac{1}{c} I \qquad \text{Eq. 1}$$

$$V_{oc} - V_t = V_2 + I r_1 \qquad \text{Eq. 2}$$

where: $V_2$ is a voltage across c or $r_2$ from the circuit model;

$$\dot{V}_2 = \frac{dV_2}{dt}$$

is the time based derivative of $V_2$; $r_2$ is a charge transfer resistance of the battery; c is a double layer capacitance of the battery; I is the measured battery current; $V_{oc}$ is the open circuit voltage of the battery; $V_t$ is the measured battery voltage across the battery terminals (terminal voltage); and $r_1$ is an internal resistance of the battery.

The battery current (I) and voltage ($V_t$) may be regularly measured at some predetermined frequency so that these values can be used by other vehicle control systems. In the case of an open circuit voltage for the battery ($V_{oc}$) the value can be directly measured when the vehicle is started before an electrical contactor (not shown) is closed, if a battery internal diffusion process is considered to have stopped. When the vehicle is running, however, and the contactor is closed, the open circuit voltage ($V_{oc}$) is estimated. Additionally, the battery ECM parameters ($r_1$, $r_2$, and c) are estimated values.

Figure 4:
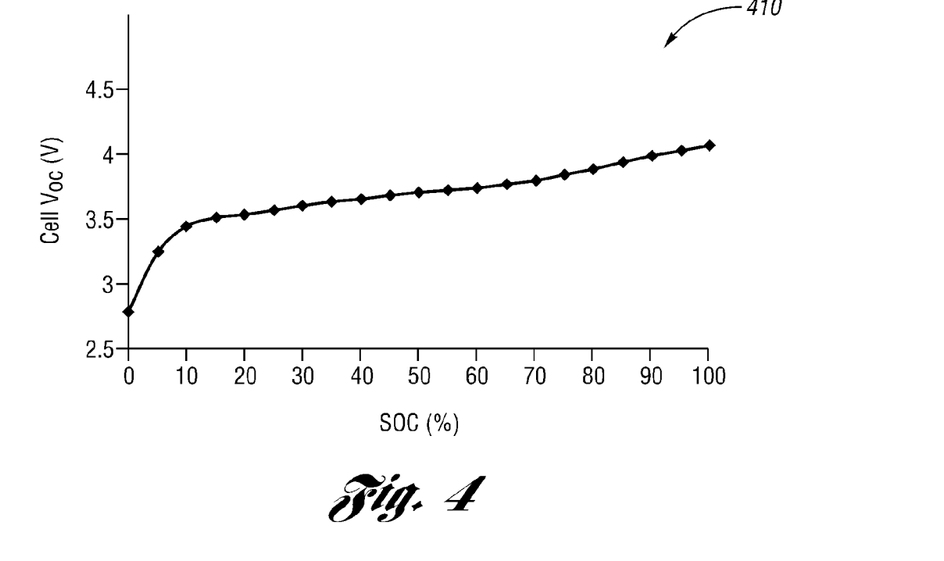
FIG. 4 is a graph that can be used with one or more embodiments, and illustrates a relationship between an open circuit voltage for a battery cell and its state of charge.

FIG. 4 shows one way by which the open circuit voltage of a cell of the battery ($V_{oc\_cell}$) can be estimated based on the cell SOC. The graph 410 shown in FIG. 4 illustrates a monotonic relationship between the $V_{oc\_cell}$ and SOC for a cell of a lithium ion battery. Other types of batteries, having different battery chemistries, may exhibit similar relationships, or different relationship that are nonetheless known and can be used in a similar fashion to the graph 410 shown in FIG. 4.

There may be a number of ways to determine the $V_{oc}$ from the SOC; the method that is used may depend, for example, on whether the SOC is known for the battery pack as a whole, or if the SOC is known for each of the individual battery cells. In the case where the SOC is known for each of the battery cells, Equation 3 as shown below can be used for battery pack $V_{oc}$ determination.

$$V_{oc} = \sum_{i=1}^{N} V_{oc\_cell\ i} = \sum_{i=1}^{N} f(SOC_i) \qquad \text{Eq. 3}$$

where: N is the number of battery cells in the battery pack, and there is a one to one relationship between cell $V_{oc}$ and cell SOC.

Using the known SOC values for each battery cell, a corresponding $V_{oc}$ value can be determined from predetermined data, such as a lookup table or from some other known relationship between the $V_{oc}$ and the SOC. Then, each of the calculated $V_{oc\_cell}$ values for the individual battery cells can be summed to provide the total $V_{oc}$ for the battery pack. In this model, it is assumed that the battery cells are connected in series, thereby making their voltages additive. Calculating the $V_{oc}$ in this matter provides a very accurate estimate of the battery $V_{oc}$, which cannot be directly measured after the contactor is closed. By adding all of the $V_{oc\_cell}$ values together, the weakest battery cells will lower the overall $V_{oc}$ for the battery pack, ensuring that its value is not unrealistically high.

Another way to determine a $V_{oc}$ for the battery pack is shown in Equations 4 and 5 below.

$$V_{oc} = N \times V_{oc\_min} = N \times f(SOC_{min}) \text{ during discharge} \qquad \text{Eq. 4}$$

$$V_{oc} = N \times V_{oc\_max} = N \times f(SOC_{max}) \text{ during charge} \qquad \text{Eq. 5}$$

where $SOC_{min}$ refers to the minimum SOC among all cells in a series connection, while $SOC_{max}$ refers to the maximum SOC among all cells in a series connection.

As shown in Equations 4 and 5, the open circuit voltage ($V_{oc}$) is calculated using different equations, depending on whether the battery is presently discharging (Eq. 4), or charging (Eq. 5). The reason for this is that there are two different battery power capabilities, one associated with battery discharge and another associated with battery charge. Each of these battery power capabilities are limited by different values of the $V_{oc}$. For example, the discharge battery power capability is limited by the minimum $V_{oc}$ for the battery pack; whereas, the charge battery power capability is limited by the maximum $V_{oc}$ for the battery pack. Equations 4 and 5 can be used as an alternative to Equation 3 even if the SOC for each of the batteries cells is known. In such a case, the smallest battery cell SOC will be used in Equation 4, and the largest battery cell SOC used in Equation 5.

Although some of the variables occurring in Equations 1 and 2 such as (I) and ($V_t$) can be measured directly, the determination of other variables may require different means. For example, one way to determine values for at least some of the variables in Equations 1 and 2 is to apply a recursive parameter estimation method, such as a Kalman filter or an EKF to the equations. A Kalman filter is used for estimating states for a linear system. An EKF may be used for nonlinear systems, by utilizing a linearization process at every time step, to approximate the nonlinear system with a linear time varying system. Since battery parameter estimations are generally non-linear, the vehicle system estimates the battery ECM parameters using an EKF, according to one or more embodiments. One way that an EKF can be applied is to consider the current (I) as the input, the voltage ($V_2$) as a state, and the term ($V_{oc}-V_t$) as the output. The battery ECM parameters ($r_1$, $r_2$ and c) or their various combinations are also treated as states to be identified. Once the battery ECM parameters and other unknowns are identified, the SOC and the power capability can be calculated based on operating limits of a battery voltage and current, and the current battery state.

An EKF is a dynamic system, that is governed by the following equations:

$$X_k = f(X_{k-1}, u_{k-1}, w_{k-1})$$

$$Y_k = h(X_k, v_{k-1}) \quad \text{Eq. 6}$$

where: $X_k$ includes the state $V_2$ and the other three battery ECM Parameters; $u_k$ is the input (e.g., battery current); $w_k$ is the process noise; $Y_k$ is the output ($V_{oc}-V_t$); and $v_k$ is the measurement noise.

One such system of equations for the battery model as considered can be shown as follows:

$$X = \begin{bmatrix} x_1 \\ x_2 \\ x_3 \\ x_4 \end{bmatrix} = \begin{bmatrix} V_2 \\ \frac{1}{r_2 c} \\ \frac{1}{c} \\ r_1 \end{bmatrix}$$

The corresponding state space equation, in discrete or continuous time, can be obtained in the form of Equation 6.

Based on the system model shown in Equations 6, an observer is designed to estimate the extended states ($x_1$, $x_2$, $x_3$ and $x_4$), and correspondingly ($V_2$, $r_1$, $r_2$, and c), according to Equations 7-10 as shown below:

$$(\hat{V}_2) = x_1 \quad \text{Eq. 7}$$

$$(\hat{r}_1) = x_4 \quad \text{Eq. 8}$$

$$(\hat{r}_2) = \frac{x_3}{x_2} \quad \text{Eq. 9}$$

$$(\hat{c}) = \frac{1}{x_3} \quad \text{Eq. 10}$$

The complete set of EKF equations consists of time update equations and measurement update equations. The EKF time update equations project the state and covariance estimate from the previous time step to the current step:

$$\hat{x}_k^- = f(\hat{x}_{k-1}, u_{k-1}, 0)$$

$$P_k^- = A_k P_{k-1} A_k^T + W_k Q_{k-1} W_k^T \quad \text{Eq. 11}$$

where: $\hat{x}_k^-$ represents a priori estimate of $x_k$; $P_k^-$ represents a priori estimate error covariance matrix; $A_k$ represents the Jacobian matrix of the partial derivatives of f with respect to X; $P_{k-1}$ represents a posteriori estimate error matrix of last step; $A_k^T$ represents transpose of matrix $A_k$; $W_k$ represents the Jacobian matrix of the partial derivatives of f with respect to process noise variable w; $Q_{k-1}$ represents a process noise covariance matrix, and $W_k^T$ represents transpose of matrix $W_k$.

The measurement update equations correct the state and covariance estimate with the measurement:

$$K_k = P_k^- H_k^T (H_k P_k^- H_k^T + V_k R_k V_k^T)^{-1} \quad \text{Eq. 12}$$

$$\hat{x}_k = \hat{x}_k^- + K_k(z_k - h(\hat{x}_k^-, 0)) \quad \text{Eq. 13}$$

$$P_k = (1 - K_k H_k) P_k^- \quad \text{Eq. 14}$$

where: $K_k$ represents the EKF gain; $H_k$ represents the Jacobian matrix of the partial derivatives of h with respect to X; $H_k^T$ is the transpose of $H_k$; $R_k$ represents a measurement noise covariance matrix; $V_k$ represents the Jacobian matrix of the partial derivatives of h with respect to measurement noise variable v; and $V_k^T$ is the transpose of $V_k$.

From Equation 12, the EKF gain (K), is generally inversely proportional to the measurement noise covariance matrix value (R). Thus as the EKF gain factor R increases, EKF gain (K) decreases, and vice versa.

Generally, in controls theory a large feedback gain normally leads to under damped responses (faster response, and larger oscillations of the controlled variables), and potentially unstable, closed loop system. On the other hand, a small feedback gain normally leads to over damped responses (slower response). Therefore, an improper EKF gain may either lead to large oscillation, or slow learning, of the learned ECM parameters, in particular resistor $r_1$, and directly impacts the quality of power capability estimation, in terms of estimation accuracy (bias) or learning speed.

The BECM 14 selects a value for the EKF gain factor R from predetermined data, based on the measured battery temperature, according to one or more embodiments. For example, in one embodiment, the predetermined data includes a lookup table with a fixed value for R, at temperatures above 10° C.; and increasing values for EKF gain factor R as the temperature drops from 10° C. to −40° C., as shown in Table A below.

TABLE A

Example Lookup Table for Temperature Dependent Gain Factor R

| | Temp. (deg C.) | | | | | | | | | |
|---|---|---|---|---|---|---|---|---|---|---|
| | −40 | −30 | −20 | −10 | 0 | 10 | 20 | 30 | 40 | 50 |
| EKF gain factor R | 2000 | 1000 | 500 | 200 | 100 | 10 | 10 | 10 | 10 | 10 |

Although small R matrix values (larger gain for the identifier) may lead to oscillations of the learned parameters, large R matrix values may lead to slower learning of the parameters/state and thus slower learning of SOC and power capabilities. Therefore, the BECM 14 includes a gain scheduling approach that includes a fixed gain for normal battery operating temperatures (e.g., above 10° C., as shown in Table A).

In one or more embodiments, a value for the process noise covariance matrix (Q) is also selected from predetermined data based on battery temperature. These two matrices (Q and R) provide gain factors for the determination of the EKF gain, as shown in Equations 11 and 12.

The first order differential equation from Equations 1 and 2 can be solved using the estimated battery ECM parameters of equations 7-10 to yield the following expression for the battery current (I).

$$I = \frac{(V_{oc} - V_t - \hat{V}_2(0)e^{-t_d/(\hat{r}_2 * \hat{c})})}{[\hat{r}_1 + \hat{r}_2(1 - e^{-t_d/(\hat{r}_2 * \hat{c})})]} \quad \text{Eq. 15}$$

where: $t_d$ is a predetermined time value; $\hat{V}_2(0)$ is the present value of $V_2$, and e is the base of the natural logarithm.

In general, once the value for (I) from Equation 15 is determined, the battery power capability can be found. Where it is desired to determine a charge power capability for the battery, Equation 15 can be solved for a minimum value of (I), such as shown in Equation 16. By convention, current is defined as a positive (+) quantity when flowing away from a battery (discharge), and as a negative (−) quantity when flowing into the battery (charge).

$$I_{min}(t_d, V_{max}) = \frac{V_{oc} - V_{max} - \hat{V}_2(0)e^{-t_d/(\hat{r}_2 \hat{c})}}{[\hat{r}_1 + \hat{r}_2(1 - e^{-t_d/(\hat{r}_2 \hat{c})})]} \leq 0 \quad \text{Eq. 16}$$

where: the value of $(t_d)$ is predetermined, and may be for example, between 1 sec. and 10 sec., and $V_{max}$ is a maximum operating voltage for the battery, and may be considered a limiting battery voltage.

This current is then compared with a system charge current limit $(I_{lim\_ch})$. If $I_{min}(t_d, V_{max}) < I_{lim\_ch}$, a second voltage value is calculated according to equation 17, as shown below:

$$\overline{V}_{ch} = V_{oc} - \hat{V}_2(0)e^{-t_d/(\hat{r}_2\hat{c})} - I_{lim\_ch} * [\hat{r}_1 + \hat{r}_2(1 - e^{-t_d/(\hat{r}_2\hat{c})})] \quad \text{Eq. 17}$$

The time value $(t_d)$ can be based on how battery power capabilities are used by vehicle system controller. The voltage $(V_{max})$ may be determined, for example, by a vehicle manufacturer or a battery manufacturer as the maximum voltage the battery is allowed to reach.

The charge power capability $(P_{cap\_ch}(t_d))$ for a battery as a function of time $(t_d)$ can be written in accordance with Equation 18.

$$P_{cap\_ch}(t_d) = \begin{cases} |I_{min}| * V_{max} & \text{if } I_{min} \geq I_{lim\_ch} \\ |I_{lim\_ch}| * \overline{V}_{ch} & \text{Otherwise} \end{cases} \quad \text{Eq. 18}$$

In addition to determining a charge power capability for a battery, embodiments of the present invention also provide a method for determining a discharge power capability for the battery. For determining the discharge power capability, a maximum value of the battery current (I) is used in conjunction with a minimum value of the battery voltage. Equation 15 can be used to solve for $(I_{max})$ as shown in Equation 19.

$$I_{max}(t_d, V_{min}) = \frac{(V_{oc} - V_{min} - \hat{V}_2(0)e^{-t_d/(\hat{r}_2\hat{c})})}{[\hat{r}_1 + \hat{r}_2(1 - e^{-t_d/(\hat{r}_2\hat{c})})]} \quad \text{Eq. 19}$$

where: $V_{min}$ is a minimum operating voltage of the battery pack.

This current is then compared with a system discharge current limit $I_{lim\_dch}$. If $I_{max}(t_d, V_{min}) > I_{lim\_dch}$, a second voltage value is calculated according to equation 20 as shown below:

$$\overline{V}_{dch} = V_{oc} - \hat{V}_2(0)e^{-t_d/(\hat{r}_2\hat{c})} - I_{lim\_dch} * [\hat{r}_1 + \hat{r}_2(1 - e^{-t_d/(\hat{r}_2\hat{c})})] \quad \text{Eq. 20}$$

The discharge power capability $(P_{cap\_dch}(t_d))$ for the battery as a function of the time $(t_d)$ can be determined as shown in Equation 21.

$$P_{cap\_dch}(t_d) = \begin{cases} |I_{max}| * V_{min} & \text{if } I_{max} \leq I_{lim\_dch} \\ |I_{lim\_dch}| * \overline{V}_{dch} & \text{Otherwise} \end{cases} \quad \text{Eq. 21}$$

Equations 15-21 calculate power capability using battery ECM parameters (e.g., $r_1$, $r_2$ and c) that are estimated by the EKF (Equations 7-10).

For example, in one embodiment the discharge power capability $(P_{cap\_dch})$ was calculated using Equation 21. When the battery temperature was −30° C., if the BECM 14 selected a default EKF gain factor R of 10 as it is used also in normal temperature (e.g., >10° C.), then EKF provided an estimated internal resistance of the battery $(\hat{r}_1)$ of 1.17Ω+/−20%. If a difference between the open circuit voltage and the minimum operating voltage of the battery pack $(V_{oc}-V_{min})$ value of 129.2 V; a voltage drop across c $(V_2)$ of 0.0 V; an estimated charge transfer resistance of the battery $(\hat{r}_2)$ of 0.501Ω; an estimated double layer capacitance of the battery $(\hat{c})$ of 40.79 F; and a time duration $(t_d)$ of 1 second, the discharge power capability was calculated to be oscillating between 13.75 kW and 20.45 kW, with a nominal value of 16.44 kW. Thus, with $r_1$ oscillating by +/−20%, the discharge power capability varies by −16.39% to 24.38% about a nominal value.

Figure 5:
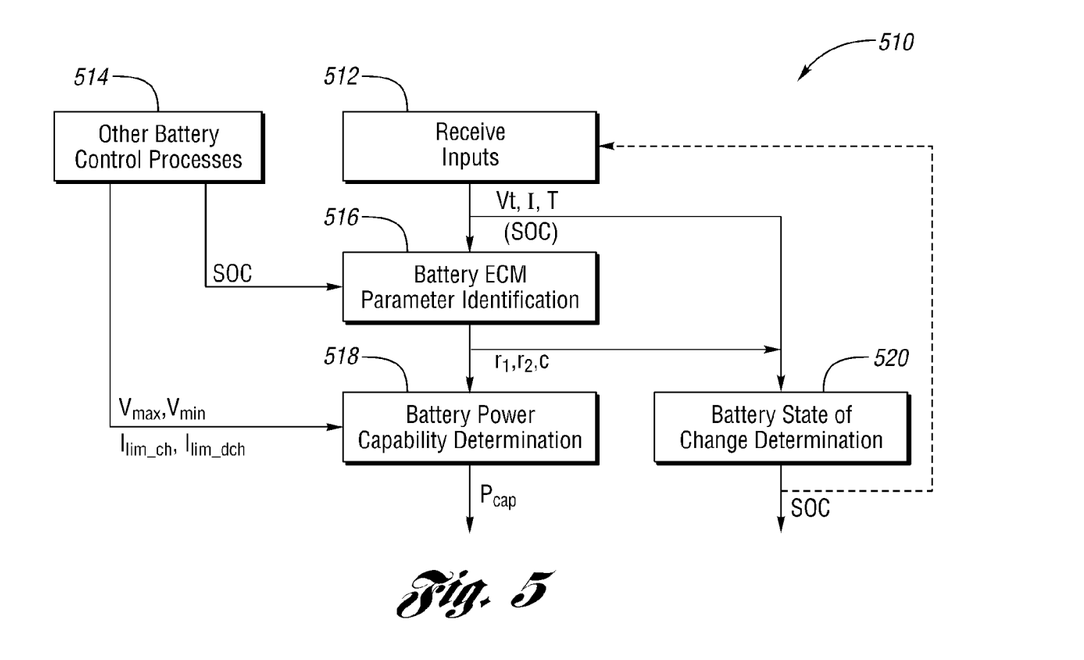
FIG. 5 is a flow chart illustrating a method for estimating battery parameters according to one or more embodiments.

With reference to FIG. 5, a method for estimating battery parameters based on battery temperature is illustrated according to one or more embodiments and is generally referenced by numeral 510. The method 510 is implemented using software code contained within the BECM 14 according to one or more embodiments. In other embodiments, the method 510 is implemented in other vehicle controllers, or multiple vehicle controllers.

In operation 512, the BECM 14 receives input that is indicative of battery temperature (T), battery terminal voltage $(V_t)$ and battery current (I). The input is provided by battery sensors according to one or more embodiments. In one or more embodiments, the input includes a previously estimated SOC (as represented by a dashed line in the illustrated embodiment).

In operation 514 the BECM 14 determines battery control parameters, such as the SOC and battery voltage and current limits ($V_{max}$, $V_{min}$, $I_{lim\_ch}$, $I_{lim\_dch}$). In one embodiment, the BECM 14 calculates the SOC using the ampere-hour-integration method.

In operation 516, the BECM 14 identifies battery ECM parameters (e.g., $r_1$, $r_2$, and c) using a recursive parameter estimation method, such as an EKF. The battery ECM parameters are estimated based on input V_, I, T and SOC according to Equations 6-14 according to one or more embodiments. The SOC may be provided by operation 512 or 514. In one or more embodiments the method 510 utilizes both SOC values at different vehicle conditions.

In operation 518, the BECM 14 determines the battery power capability ($P_{cap}$). The BECM 14 utilizes Equations 15-21 for estimating the charging and discharging battery power capability, respectively. Further, because the power capabilities as shown in Equations 18 and 21 are time-based functions of td, multiple values of $P_{cap}$ can be calculated for each of the charge and discharge power capabilities.

In operation 520 the BECM 14 determines the battery SOC. The BECM 14 utilizes Table A to select EKF gain factor R in the battery ECM parameter estimation. The estimated battery ECM parameters are then used for estimating SOC.

FIGS. 6-8A illustrate the impact of the method 510 for estimating battery ECM parameters based on battery temperature. FIGS. 6-8A include six graphs of waveforms based on data taken over a common period of time, and at a cold battery temperature (e.g., −30° C.). The waveforms shown in solid line illustrate data estimated based on a temperature compensated gain scheduling approach, according to the method 510. When the method 510 is active, the BECM 14 selects one or more gain factors (R and Q) from predetermined data based on the battery temperature. For comparison, the waveforms shown in dashed line illustrate data estimated using a fixed EKF gain factor.

Figure 6:
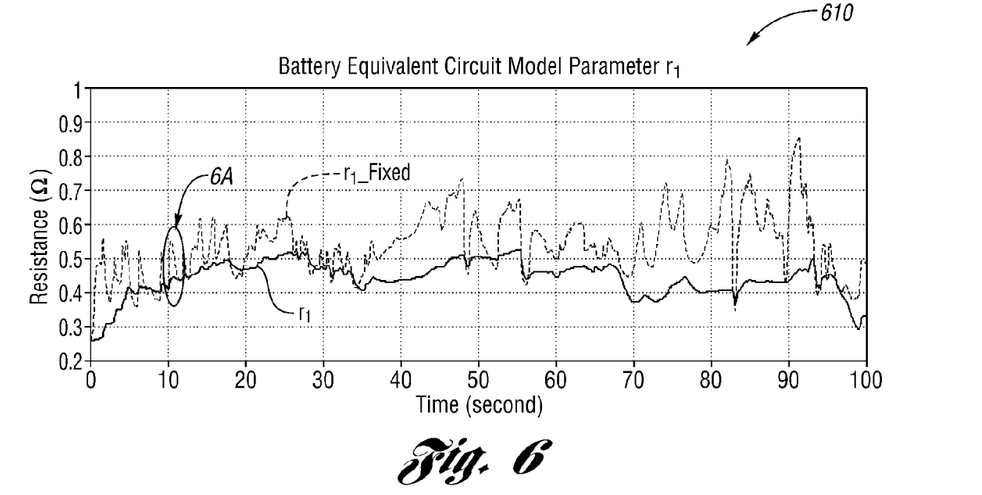
FIG. 6 is a graph illustrating a battery ECM parameter estimated in accordance with one or more embodiments.

FIG. 6 illustrates the internal resistance of the battery ($r_1$) over time and is generally referenced by numeral 610. The BECM 14 estimates $r_1$ based on the EKF gain (K) that was determined in Equation 12, according to one or more embodiments. The waveform ($r_1$) is based on data that was estimated using the temperature compensated gain scheduling approach of method 510. The waveform ($r_{1\_fixed}$) is generated based on data estimated using a fixed EKF gain factor. While it is qualitatively clear that the waveform $r_1$ is far less oscillatory than that of the $r_{1\_fixed}$ waveform, a quantitative comparison can be made only for a short period of time. The internal resistance ($r_1$) depends on battery temperature and SOC, both of which change gradually over time. Therefore $r_1$ is generally constant for a given short time period (e.g., 1 second).

Figure 6A:
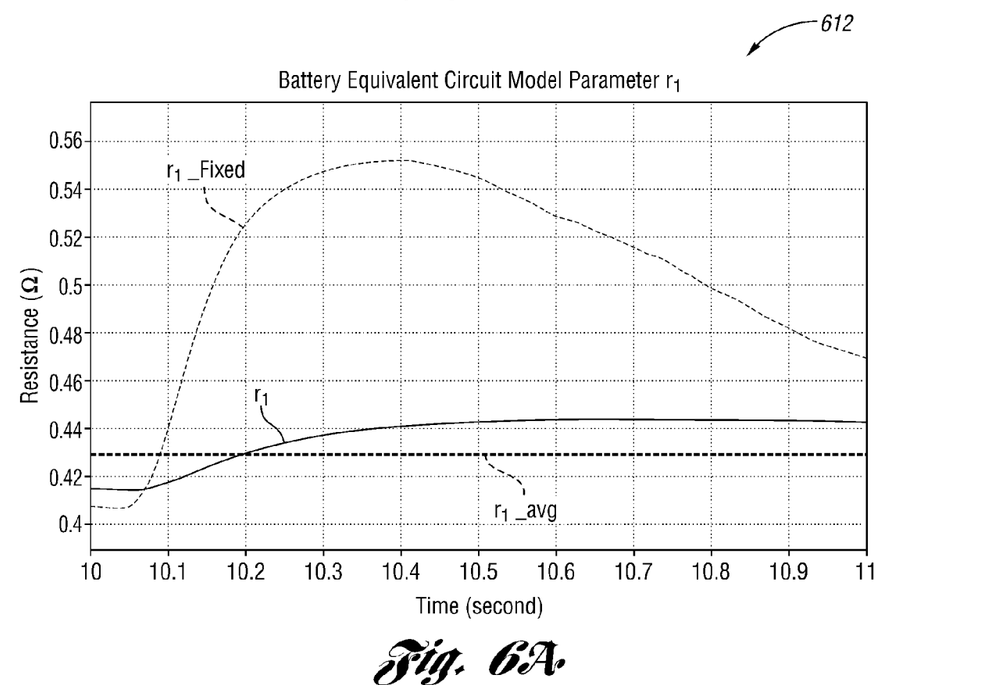
FIG. 6A is an enlarged view of a portion of FIG. 6.

FIG. 6A depicts an enlarged view of a portion of the graph illustrated in FIG. 6. FIG. 6A illustrates a graph of the $r_1$ and $r_{1\_fixed}$ waveforms between 10-11 seconds, and is generally referenced by numeral 612. The $r_{1\_fixed}$ waveform depicts a resistance between 0.41Ω and 0.55Ω, with an average value ("$r_{1\_avg}$") of 0.51Ω, and a deviation of approximately −19.61% to 7.84%. However, the $r_1$ waveform, based on temperature compensated gain scheduling approach, depicts a resistance between 0.41Ω and 0.44Ω, with an average value ($r_{1\_avg}$) of 0.43Ω, and a deviation of approximately −3.6% to 3.14%. Such an evaluation could be extended to the entire time period shown in FIG. 6, based on a fitted average internal resistance curve (not shown).

Figure 7:
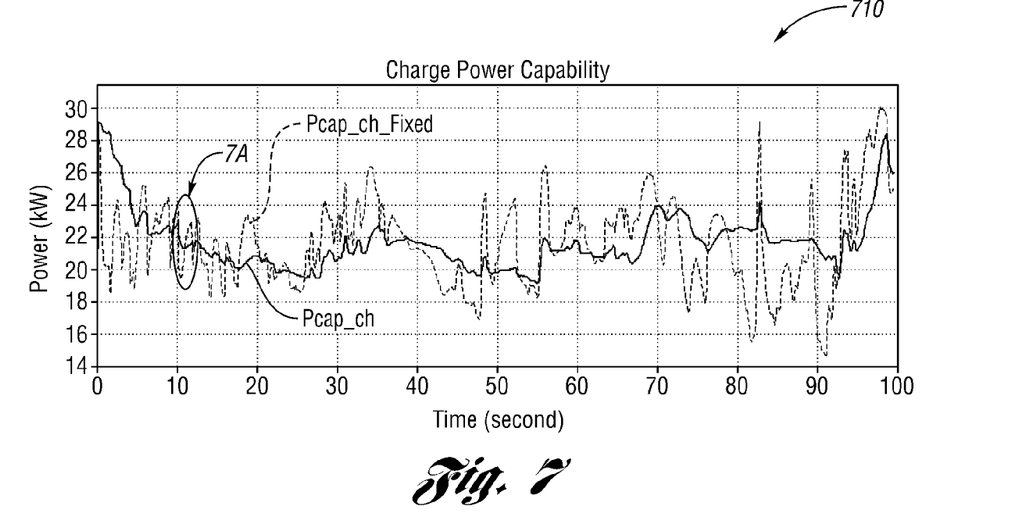
FIG. 7 is a graph illustrating battery charge power capability calculated in accordance with one or more embodiments.

FIG. 7 illustrates the estimated charge power capability ($P_{cap\_ch}$) over time and is generally referenced by numeral 710. The BECM 14 calculates $P_{cap\_ch}$ using equation 18, based on the battery ECM parameters (including $r_1$) that are identified by the EKF. The waveform ($P_{cap\_ch}$) is based on data that was estimated using the temperature compensated gain scheduling approach of method 510. The waveform ($P_{cap\_ch\_fixed}$) is generated based on data estimated using a fixed EKF gain factor. While it is qualitatively clear that the waveform $P_{cap\_ch}$ is far less oscillatory than that of the $P_{cap\_ch\_fixed}$ waveform, a quantitative comparison can be made only for a short period of time. The charge power capability ($P_{cap\_ch}$) depends on battery temperature and SOC, both of which change gradually over time. Therefore $P_{cap\_ch}$ is generally constant for a given short time period (e.g., 1 second).

Figure 7A:
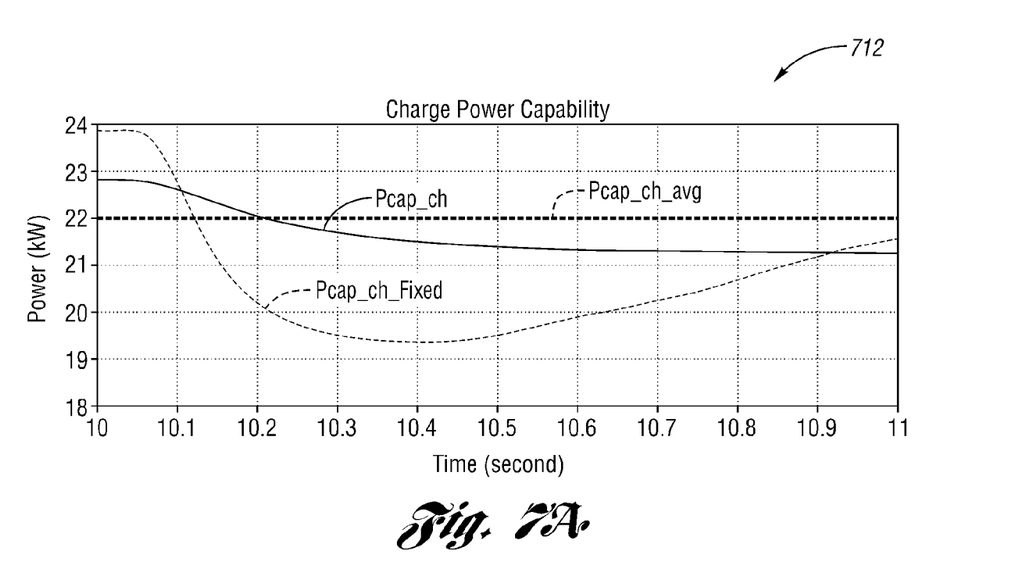
FIG. 7A is an enlarged view of a portion of FIG. 7.

FIG. 7A depicts an enlarged view of a portion of the graph illustrated in FIG. 7. FIG. 7A illustrates a graph of the $P_{cap\_ch}$ and $P_{cap\_ch\_fixed}$ waveforms between 10-11 seconds, and is generally referenced by numeral 712. The $P_{cap\_ch\_fixed}$ waveform depicts a charge power capability between 19.33 kW and 23.85 kW, with an average value $P_{cap\_ch\_avg\_fixed}$ (not shown) of 21.6 kW and a deviation of approximately −10.5% to 10.42%. However the $P_{cap\_ch}$ waveform, which based on temperature compensated gain scheduling approach of the method 510, depicts a battery charge power capability between 21.28 kW and 22.81 kW, with an average value ($P_{cap\_ch\_avg}$) of 22 kW and a deviation of approximately −3.27% to 3.68%. Such an evaluation could be extended to the entire time period shown in FIG. 7, based on a fitted average charge power capability curve (not shown).

Figure 8:
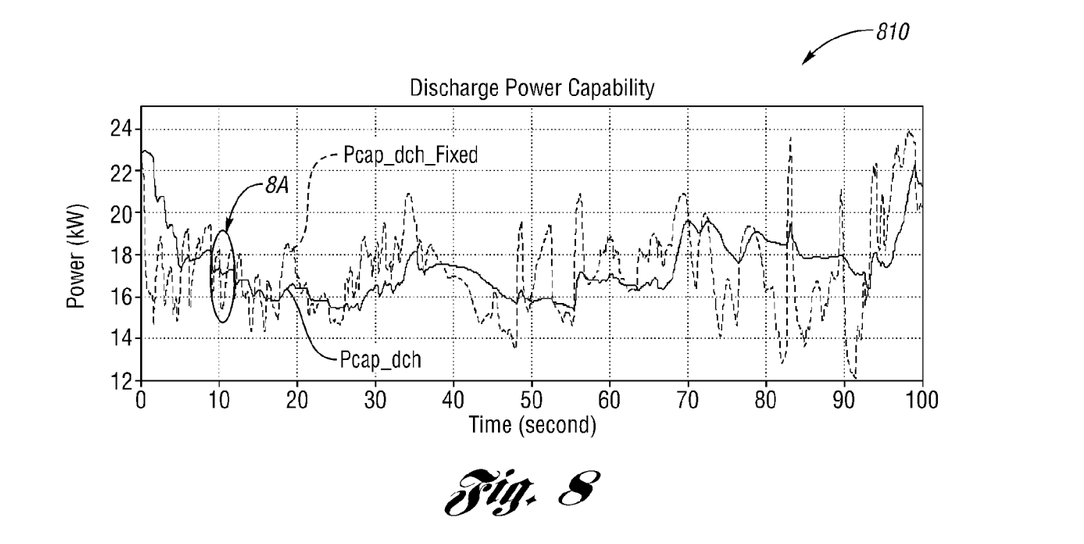
FIG. 8 is a graph illustrating battery discharge power capability calculated in accordance with one or more embodiments.

FIG. 8 illustrates the estimated discharge power capability ($P_{cap\_dch}$) over time and is generally referenced by numeral 810. The BECM 14 calculates $P_{cap\_dch}$ using equation 21, based on the battery ECM parameters (including $r_1$) that are identified by the EKF. The waveform ($P_{cap\_dch}$) is based on data that was estimated using the temperature compensated gain scheduling approach of method 510. The waveform ($P_{cap\_dch\_fixed}$) is generated based on data estimated using a fixed EKF gain factor. While it is qualitatively clear that the waveform $P_{cap\_dch}$ is far less oscillatory than that of the $P_{cap\_dch\_fixed}$ waveform, a quantitative comparison can be made only for a short period of time. The discharge power capability ($P_{cap\_dch}$) depends on battery temperature and the SOC, both of which change gradually over time. Therefore $P_{cap\_dch}$ is generally constant for a given short time period (e.g., 1 second).

Figure 8A:
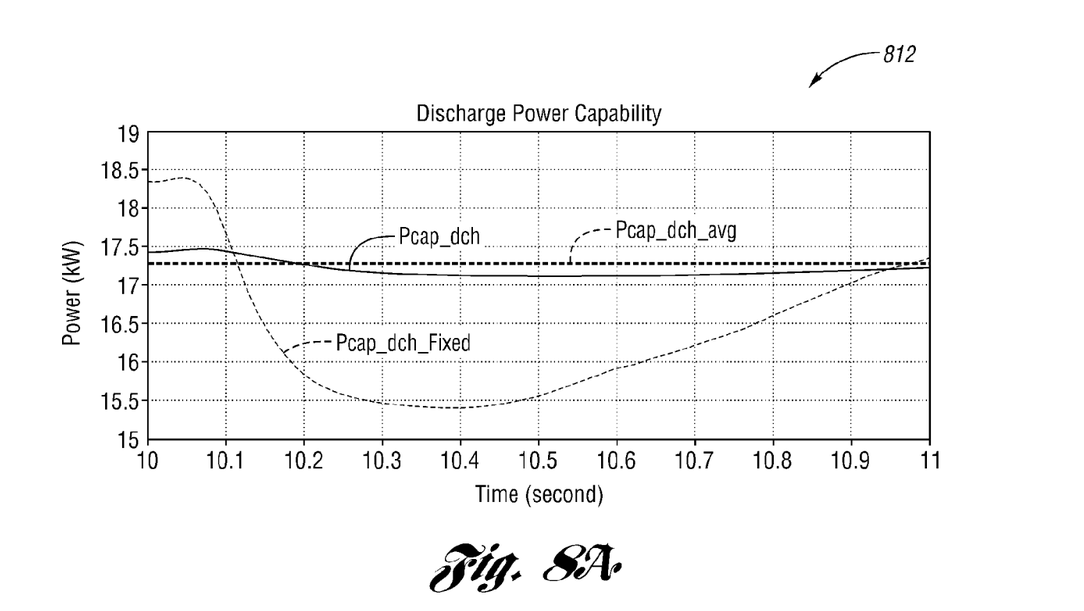
FIG. 8A is an enlarged view of a portion of FIG. 8.

FIG. 8A depicts an enlarged view of a portion of the graph illustrated in FIG. 8. FIG. 8A illustrates a graph of the $P_{cap\_dch}$ and $P_{cap\_dch\_fixed}$ waveforms between 10-11 seconds, and is generally referenced by numeral 812. The $P_{cap\_dch\_fixed}$ waveform depicts a discharge power capability between 15.40 kW and 18.38 kW, with an average value $P_{cap\_dch\_avg\_Fixed}$ (not shown) of 16.37 kW and a deviation of approximately −5.92% to 12.27%. However the $P_{cap\_dch}$ waveform, which is based on the temperature compensated gain scheduling approach of method 510, depicts a battery discharge power capability between 17.12 kW and 17.46 kW, with an average value ($P_{cap\_ch\_avg}$) of 17.29 kW and a deviation of approximately −0.98% to 0.98%. Such an evaluation could be extended to the entire time period shown in FIG. 8, based on a fitted average discharge power capability curve (not shown).

As such, the vehicle system 10 provides advantages over existing method by estimating battery ECM parameters by using variable EKF gain factor, based on battery temperatures, rather than using a fixed EKF gain factor. Such a temperature compensated gain scheduling approach results in a more accurate estimation of battery power capability at low temperature conditions as compared to existing methods if the fixed selected EKF gain factor is preferable for room temperature, and vice versa. Thus a temperature compensated gain scheduling approach results in an accurate estimation of battery power capability for all battery operating temperature range.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle comprising:
    an electric machine configured to provide drive torque;
    a battery for supplying power to the electric machine; and
    a controller configured to:
        select a gain factor from predetermined data based on battery temperature, wherein the gain factor corresponds to a constant value above a threshold battery temperature and increases as the battery temperature decreases below the threshold battery temperature;
        estimate a variable gain based on the gain factor;
        estimate battery equivalent circuit model (ECM) parameters based on the variable gain; and
        generate output indicative of at least one of a battery power capability and a battery state of charge using a filter based on the battery ECM parameters.

2. The vehicle of claim 1 wherein the filter further comprises an extended Kalman filter (EKF) and wherein the controller is further configured to:
    generate output indicative of battery equivalent circuit model (ECM) parameters using the EKF having a system input based on battery current, a system output based on a battery voltage, and a system state that is indicative of the battery ECM parameters; and
    calculate at least one of the battery power capability and the battery state of charge based on the battery ECM parameters.

3. The vehicle of claim 2 wherein the battery ECM parameters further comprise at least one of a battery internal resistance, a battery charge transfer resistance, and a battery double layer capacitance.

4. The vehicle of claim 1 wherein the gain factor corresponds to one of a measurement noise covariance matrix value, and a process noise covariance matrix value.

5. The vehicle of claim 1 wherein the gain factor corresponds a measurement noise covariance matrix value, and wherein the variable gain is generally inversely related to the gain factor.

6. A vehicle system comprising:
    a battery for supplying power to an electric machine;
    a controller configured to:
        receive input indicative of a battery temperature,
        select a gain factor from predetermined data based on the battery temperature, wherein the gain factor corresponds to a constant value above a threshold battery temperature and increases as the battery temperature decreases below the threshold battery temperature,
        estimate a variable gain based on the gain factor, and
        generate output indicative of at least one of a battery power capability and a battery state of charge based in part on the variable gain.

7. The vehicle system of claim 6 wherein the gain factor represents a measurement noise covariance matrix value.

8. The vehicle system of claim 6 wherein the gain factor represents a process noise covariance matrix value.

9. The vehicle system of claim 6 wherein the controller is further configured to:
    calculate the variable gain for an extended Kalman filter (EKF).

10. The vehicle system of claim 9 wherein the controller is further configured to:
    estimate battery ECM parameters using the EKF, the EKF having a system input based on battery current, a system output based on a battery voltage, and a system state that is indicative of the battery ECM parameters; and
    calculate at least one of the battery power capability and the battery state of charge based on the battery ECM parameters.

11. The vehicle system of claim 6 wherein the controller is further configured to:
    receive input indicative of a battery voltage limit and a battery current limit; and
    calculate the battery power capability based on the battery voltage limit, the battery current limit and the variable gain.

12. The vehicle system of claim 6 wherein the controller is further configured to:
    identify circuit model variables corresponding to battery ECM parameters based in part on the variable gain; and
    calculate the battery power capability based on the circuit model variables and the variable gain.

13. The vehicle system of claim 12 wherein the circuit model variables include a first resistor corresponding to a battery internal resistance, a second resistor corresponding to a battery charge transfer resistance, and a capacitor corresponding to a battery double layer capacitance.

14. The vehicle system of claim 6 wherein the controller is further configured to:
    identify circuit model variables corresponding to battery ECM parameters based in part on the variable gain; and
    calculate the battery state of charge based on the circuit model variables and the variable gain.

15. The vehicle system of claim 6 wherein the variable gain is generally inversely related to the gain factor.

16. A method for controlling a hybrid vehicle, the method comprising:
    receiving input signals indicative of a battery temperature, a battery current and a battery voltage;
    selecting a gain factor from predetermined data based on the battery temperature, wherein the gain factor corresponds to a constant value above a threshold battery temperature and increases as the battery temperature decreases below the threshold; and
    generating output indicative of at least one of a battery power capability and a battery state of charge using an extended Kalman filter (EKF) having a variable gain based on the gain factor.

17. The method of claim 16 further comprising:
    receiving input indicative of a battery voltage limit and a battery current limit; and
    calculating at least one of the battery power capability and the battery state of charge based on the battery voltage limit, the battery current limit and the variable gain.

18. The method of claim 16 further comprising:
    estimating battery ECM parameters based on the battery current, battery voltage and the variable gain; and
    calculating the battery power capability based on the battery ECM parameters and the variable gain.

* * * * *